United States Patent
Bullock

(10) Patent No.: US 7,519,294 B2
(45) Date of Patent: Apr. 14, 2009

(54) METHOD AND APPARATUS FOR PROVIDING INTEGRATED SYMMETRIC AND ASYMMETRIC NETWORK CAPACITY ON AN OPTICAL NETWORK

(75) Inventor: Paul Bullock, Allen, TX (US)

(73) Assignee: Nortel Networks Limited, St. Laurent, Quebec (CA)

(*) Notice: Subject to any disclaimer, the term of this patent is extended or adjusted under 35 U.S.C. 154(b) by 0 days.

(21) Appl. No.: 11/906,821

(22) Filed: Oct. 4, 2007

(65) Prior Publication Data

US 2008/0037988 A1 Feb. 14, 2008

Related U.S. Application Data

(63) Continuation of application No. PCT/US2005/034063, filed on Sep. 23, 2005.

(60) Provisional application No. 60/673,852, filed on Apr. 22, 2005.

(51) Int. Cl.
*H04B 10/00* (2006.01)
*H04J 14/00* (2006.01)

(52) U.S. Cl. ............... 398/59; 398/3; 398/5; 398/66; 398/70; 398/71; 398/72; 398/167.5

(58) Field of Classification Search ............ 398/3, 398/5, 66–72, 167.5
See application file for complete search history.

(56) References Cited

U.S. PATENT DOCUMENTS 5,442,623 A * 8/1995 Wu ..................... 370/224
5,864,672 A * 1/1999 Bodeep et al. ............ 725/126
7,164,861 B2 * 1/2007 Takachio et al. ........... 398/70
2004/0264440 A1 12/2004 Wan et al.
2006/0039278 A1 * 2/2006 Harby et al. .............. 370/225

OTHER PUBLICATIONS

Cisco Systems White Paper, "Converged Optical Architectures for Cable Operators" 1992.
FiberLine Fiber Optic Technology, "Banking on Asymmetry, The Cost Benefits of an Asymmetric Reverse Path for VOD" CED/Jan. 2004.
X Zhang, et al. "An Effective and Comprehensive Approach for Traffic Grooming and Wavelength Assignment in SONET/WDM Rings." IEEE/ACM Transactions on Networking, vol. 8, No. 5, Oct. 2000.
P. Bullock, "Asymmetric Transport Competitive Outlook", not published but containing a summary of trends by other participants in the asymmetric transport market (18 pages) Apr. 11, 2005.

* cited by examiner

*Primary Examiner*—Ken N Vanderpuye
*Assistant Examiner*—Danny W. Leung
(74) *Attorney, Agent, or Firm*—Anderson Gorecki & Manaras LLP

(57) ABSTRACT

A symmetrical capacity network may be adapted to accommodate asymmetrical network traffic patterns by deploying Protected Dedicated Wavelengths (PDWs) between one or more head-end nodes and the access nodes on a ring-based topology network. The PDWs include pairs of wavelengths extending in opposite directions around the fibers forming the original ring and terminating at the intended access node. The pairs of wavelengths form unidirectional working and protection paths from the head-end node to the intended access nodes. By deploying the symmetric capacity and asymmetric capacity on the same platform within the head-end node, it is possible to apply policy across the network resources to allow traffic flows to be selectively placed on the most appropriate network resource.

8 Claims, 9 Drawing Sheets

METHOD AND APPARATUS FOR PROVIDING INTEGRATED SYMMETRIC AND ASYMMETRIC NETWORK CAPACITY ON AN OPTICAL NETWORK

CROSS-REFERENCE TO RELATED APPLICATION

This application claims priority to U.S. Provisional Application No. 60/673,852, filed Apr. 22, 2005, entitled Dedicated Downstream Shared Upstream Protected Rings, the content of which is hereby incorporated herein by reference. This application is a continuation of PCT/US05/34063, filed Sep. 23, 2005, the content of which is hereby incorporated herein by reference.

BACKGROUND

1. Field

This application relates to communication networks and, more particularly, to a method and apparatus for providing integrated symmetric and asymmetric network capacity on an optical network.

2. Description of the Related Art

Data communication networks may include various computers, servers, hubs, switches, nodes, routers, proxies, and other devices coupled to and configured to pass data to one another. These devices will be referred to herein as "network elements". Data is communicated through the data communication network by passing protocol data units, such as frames, packets, cells, or segments, between the network elements by utilizing one or more communication links.

A particular protocol data unit may be handled by multiple network elements and cross multiple communication links as it travels between its source and its destination over the network. To allow the network elements to work together, a large number of protocols have been developed. Some of the protocols operate at the physical layer to specify what the signals should look like, others operate at the link layer to handle end-to-end communication on a particular link, while still others operate at the network layer to define routes through the network for particular connections.

When there is a failure on a communication network, the traffic that is intended to pass through the failing part of the network will need to be sent a different way through the network. There are two common ways of causing this to occur—restoration and protection.

In restoration-based failure recovery, when a failure is detected on the network, the network elements will find one or more new paths through the network that are able to carry the affected traffic. Thus, in a restoration-based system, a new path will be set up after a failure has occurred. For example, a routing protocol operating at the network layer may be used to find a new route through the network that avoids the failure.

In a protection-based system, backup paths are set up in advance so that the backup paths are already determined should a failure occur. Upon occurrence of a failure, the traffic can simply be switched from the primary or working path to the alternate or protection path without waiting for a new path to be selected to carry the traffic. Traffic is protected on a working path if there is bandwidth on a protection path to carry the traffic in the event of a failure. At the network level, therefore, a protection path is a path that is reserved or specified as being configured to carry the working path traffic flows should there be a problem on the working path.

There are several different ways traffic may be protected. For example, the protection may be dedicated or shared. Dedicated protection refers to resources that are reserved solely to protect the connection or group of connections associated with the dedicated protection. Shared protection refers to having greater working traffic than protection capacity on the protected network. Also, more than one path may provide protection for a working path. Similarly, just because a path is designated as a protection path does not mean that it must be kept empty. For example, the protection path may carry less important traffic when not being used to carry traffic from the working path. Thus, there are many different ways in which protection may be established for a connection on a network.

The particular way in which network elements are interconnected is referred to herein as the network topology. For example, one common network topology is to interconnect a group of network elements into a ring formation with communication links interconnecting adjacent nodes in the ring. Synchronous Optical NETwork (SONET) and Synchronous Data Hierarchy (SDH) networks are commonly formed in a ring topology, although other technologies such as Resilient Packet Ring (RPR), Ethernet, Unidirectional Path Switched Ring (UPSR), and Bi-directional Line Switched Ring (BLSR) may also be used in a ring-topology network.

Several of the protocols that are used to implement ring-topology networks, particularly SONET and SDH, provide for the paths on the network to be protected so that fast protection switching may occur upon detection of a failure on a portion of the ring. Several protection schemes that may be used on a SONET/SDH network are commonly referred to as Bi-directional Line Switched Ring (BLSR), Head-end node Ring Switching (HRS), and MSPring, although other protection switching schemes may also exist and may be developed over time. References to SONET herein should be understood to include SDH and other optical ring technologies.

Initially, ring-topology networks were developed to support relatively symmetrical network traffic patterns. In particular, many of the original networks were designed to carry voice traffic which is relatively symmetric. For this reason, the rings that were deployed were designed to carry the same amount of working traffic in both directions around the ring. As new network services are developed, however, traffic patterns have changed such that subscribers are now generally consuming more bandwidth than they are generating. Additionally, as video content such as video on demand becomes more readily available to subscribers, the asymmetry of network traffic is expected to continue to grow.

Numerous companies have acknowledged that network traffic may be expected to become increasingly asymmetrical in parts of the network due to the emergence of video on demand and other video related services. So far, however, there hasn't been a clear plan as to how existing ring-topology networks may be adapted to accommodate these emerging asymmetrical network traffic patterns in an efficient manner. Rather, to accommodate the asymmetrical increase in traffic, network providers have been overlaying full rings on top of the original ring networks. Although these overlay rings enable the network to accommodate the asymmetrical increase in traffic in the downstream (toward the subscriber) direction, they do not do so in a cost-effective manner. Specifically, adding a full overlay ring with upstream as well as downstream capacity may result in the needless addition of upstream capacity to the network where the only requirement was that the downstream capacity be incremented.

To address this asymmetry, Cisco Systems™ has proposed a UniDirectional Link Routing (UDLR) system which allows unidirectional links to be deployed to handle asymmetric traffic, and to allow routing protocols to be run over unidirectional links. Unidirectional optical links may thus be deployed in a conventional network to increase the one way capacity of portions of the network. For example, such links could be deployed to enable a network to have large downstream and small upstream capabilities. Unfortunately, the proposed solution relies on a layer 3 (routing layer) to enable traffic to be passed over these unidirectional links. Requiring layer 3 processing introduces jitter and delay, as compared to an all optical solution. Since video signals are very sensitive to both jitter and delay, a layer 3 solution is less desirable than an all-optical solution. Additionally, the proposed UDLR system uses a head-end node based restoration scheme in which, upon detection of a failure, the routing protocol will generate a new route to circumvent the problem area of the network. For example, a common routing protocol such as Open Shortest Path First (OSPF) may be run across the UDLR-provisioned unidirectional links. Upon detection of a failure, these protocols may take up to 5 to 7 seconds to converge on a set of new routes for traffic on the network. Thus, while this solution does provide a way to accommodate asymmetrical traffic patterns, the convergence time required to recover from a fault on the network is too long to conform to the 50 ms recovery time specified by several of the telecommunication standards that govern provision of telecommunication services over communication networks.

SUMMARY OF THE DISCLOSURE

Accordingly, it would be advantageous to have a method and apparatus for providing integrated symmetric and asymmetric network capacity on an optical network. Additionally, it would be advantageous to provide a platform that can integrate the asymmetric and symmetric aspects of an optical network at a layer below the routing layer to provide for an easy migration from the existing deployed network topologies to the new network topology to avoid having to replace the existing networks with an entirely new network. According to an embodiment of the invention, a ring-topology network may be adapted to accommodate asymmetrical network traffic patterns by deploying Protected Dedicated Wavelengths (PDWs) between one or more head-end nodes and access nodes on a ring-topology network to thereby form a protected overlay network on the original ring. By deploying both the symmetric and asymmetric capacity on the same platform, policy determinations may be made as to which capacity should be used to handle particular flows and classes of flows to thereby allow the newly deployed asymmetric capacity to be integrated with the original ring-based symmetric network capacity.

The PDWs may be deployed over the fibers that form the original ring to provide unidirectional working and protection paths from the head-end node to the intended access node. By deploying both working and protection paths for each PDW in opposite directions around the original ring, conventional protection mechanisms may be used to allow for fast protection switching of the traffic on the PDWs in the event of a failure. Since the asymmetric capacity is deployed on the same optical platform as the symmetric capacity, an all optical solution may be provided to minimize jitter and delay associated with transmission of data on the network regardless of which path is selected to carry the traffic on the network.

Flows on the network may be managed to optimize use of the increased capacity along with the original ring resources to thereby integrate the symmetric and asymmetric flows at the link layer. For example, the network elements on the ring may differentiate between downstream and upstream flows and use different resources for each of the types of flows. By integrating the asymmetric capacity with the symmetric capacity, it is possible to apply policy to the working flows on the network to determine which traffic should be carried on the particular network resources. For example, as PDWs are added to carry downstream traffic from the head-end node to the access nodes, the downstream traffic previously carried by the original ring may be pulled off the original ring and placed onto the new PDW, while allowing the upstream traffic to remain on the original ring. This allows the traffic between the head-end node and access nodes to be bifurcated such that downstream traffic from the head-end node to the access nodes is carried by one or more PDWs, while the upstream traffic is consolidated with other upstream traffic from other access nodes on the original ring.

A ring-based network may therefore be adapted from a symmetrical capacity network architecture to an asymmetrical capacity network architecture to accommodate the asymmetrical network traffic patterns, while allowing all traffic carried on the network to be protected on the link-level. Since bandwidth may be added where and when needed, a minimum number of optical transmitters and receivers may be used to implement and selectively increase the capacity of the network. Additionally, by integrating the two types of resources (symmetric and asymmetric) it is possible to apply unified policy-based decisions to the traffic on the network.

BRIEF DESCRIPTION OF THE DRAWINGS

Aspects of the present invention are pointed out with particularity in the claims. The following drawings disclose one or more embodiments for purposes of illustration only and are not intended to limit the scope of the invention. In the following drawings, like references indicate similar elements. For purposes of clarity, not every element may be labeled in every figure. In the figures:

DETAILED DESCRIPTION

The following detailed description sets forth numerous specific details to provide a thorough understanding of the invention. However, those skilled in the art will appreciate that the invention may be practiced without these specific details. In other instances, well-known methods, procedures, components, protocols, algorithms, and circuits have not been described in detail so as not to obscure the invention.

Figure 1:
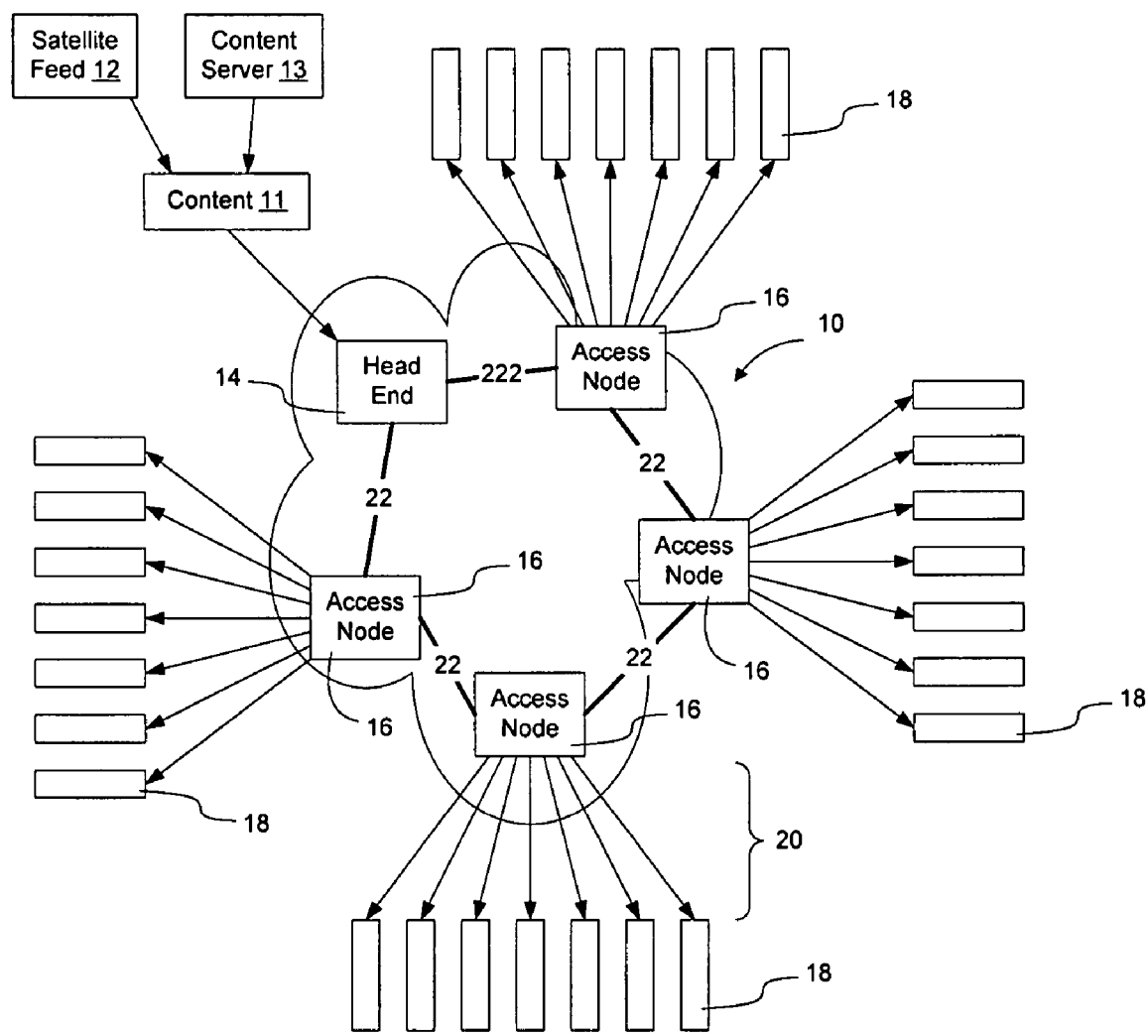
FIG. 1 is a functional block diagram of an example network architecture including a ring-topology network interconnecting a head-end node and a plurality of access nodes.

FIG. 1 illustrates an example of a network 10 in which content 11, such as video on demand content available via a satellite feed 12 or from a content server 13, is transported from a head-end node 14 to access nodes 16 and then out to subscribers 18. A distribution network 20 from the access nodes 16 to the subscribers 18 may be formed using optical fibers, copper wires, wireless links, or any other desired physical medium. The invention is not limited to a particular technology used to implement the links on the access network 20 interconnecting the subscribers 18 and access nodes 16.

For example, the links in the access networks 20 interconnecting the subscribers 18 and access nodes 16 may be implemented as twisted pair telephone wires commonly referred to as local loops. A high speed transmission technology, such as one of the Digital Subscriber Line (DSL) technologies (e.g. asymmetric DSL) may be implemented to allow high bandwidth content to be distributed from the access nodes 16 to the subscribers 18. There are many DSL technologies and the invention is not limited by the particular type of xDSL technology implemented in the access network 20. In this example, the access nodes 16 would be implemented as DSL Access Multiplexers (DSLAMs) and the subscribers would implement DSL modems to extract the content 11 for use at the subscriber premises.

As another example, the links in the access networks 20 may be implemented as optical fibers, and the network 20 may be implemented as a Passive Optical Network (PON). A Passive Optical Network (PON) is an optical network configured to use passive optical systems in the middle of the network, and active electronic optical devices, e.g. transmitters and receivers, at the network's endpoints. Typically, the network endpoints are at the central office or head-end on one side, and the customer premises on the other side. In one common configuration, an optical line terminating (OLT) network device is located at the head-end, and a plurality of optical network units (ONUs) are located at the customers' premises. Between the endpoints the network includes passive optical components, such as fiber optic cabling, optical couplers, passive branching components, passive optical attenuators, and optical splices.

As yet another example, the access network 20 may be a wireless network such as a wireless network implemented according to the WiFi standard (IEEE 802.11), the WiMax standard (IEEE 802.16), or according to one of the other wireless standards. These wireless technologies are based on various standards that allow for data communication to take place via wireless signals using point to point or point to multipoint transmissions. Other wireless technologies may be used as well.

Cable television networks may also be used as an access network. Similarly, other types of access nodes and subscriber equipment may be used as well, whether currently developed or which may become available as new technologies are developed. Thus, the invention is not limited to a particular type of access network or to the several examples set forth above.

The network 10 also includes links 22 interconnecting the head-end node 14 with the access nodes 16 and the access nodes 16 with each other. In the embodiment shown in FIG. 1, the links 22 are implemented as one or more optical fibers and organized in a ring-based network topography. Typically, depending on the particular implementation, the links 22 would be implemented using either two or four fibers, to thus form a two fiber (unidirectional) or four fiber (bidirectional) ring. As mentioned above, many technologies exist that may be used to implement a ring-based network, and the invention is not limited to use of a particular technology.

Ring-topology networks provide both working and protection paths so that traffic may be protection switched to a predetermined alternate path upon occurrence of a failure on the network. Depending on the particular standard chose to implement the original ring, the exact manner in which protection switching occurs may vary somewhat. Since the standards governing protection switching on a ring-topology network are well known, additional discussion of this aspect will not be discussed in greater detail herein.

According to an embodiment of the invention, a novel network topology is created in which the original ring topology is integrated with asymmetrical capacity in the same network element, so that the underlying protection mechanism may be used to protect the traffic while allowing policy to be applied to traffic flows on the network to coordinate use of the asymmetric and symmetric network resources.

Figure 2:
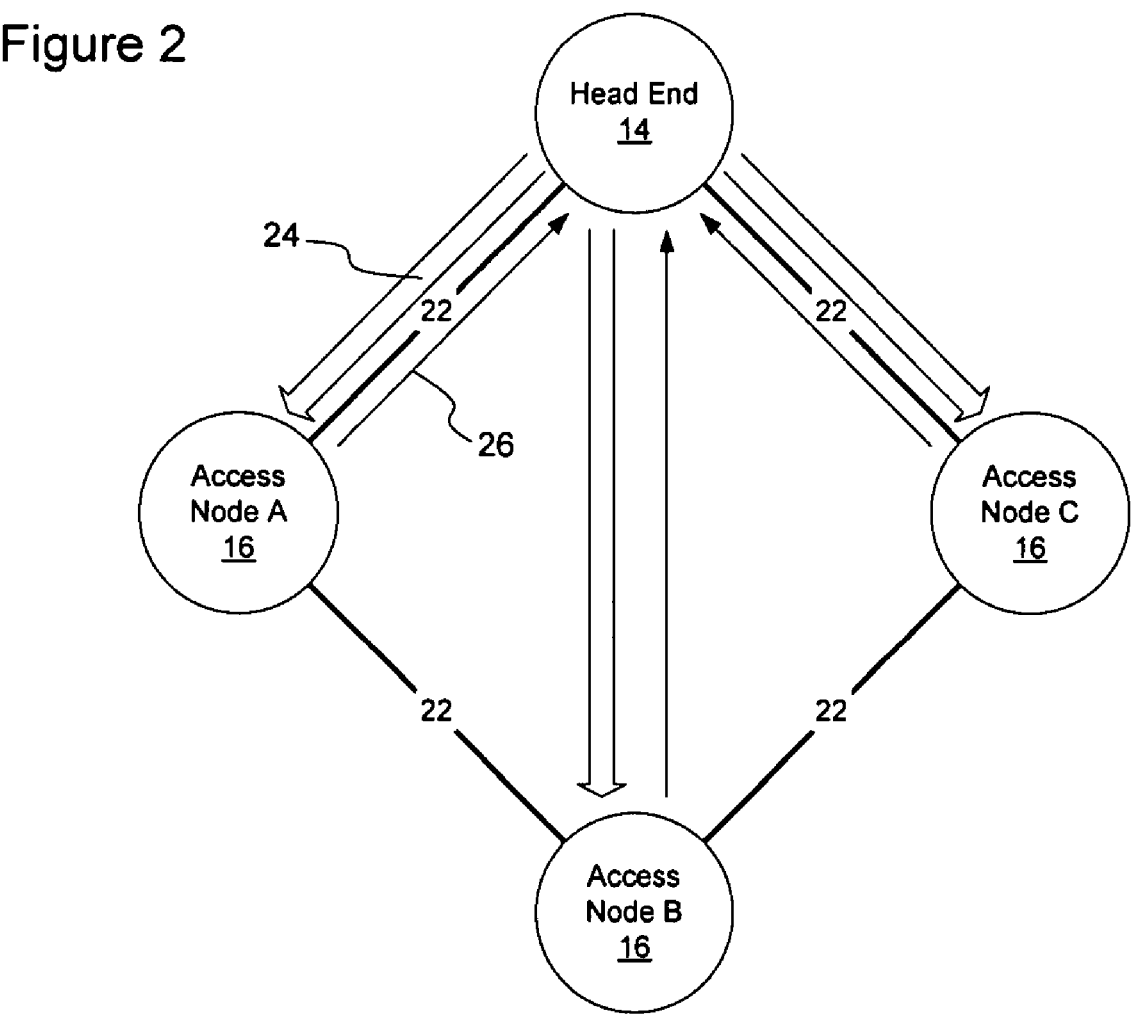
FIG. 2 is a functional block diagram illustrating asymmetrical traffic patterns in an example network having one head-end node and three access nodes.

FIG. 2 illustrates a logical view of asymmetrical network traffic patterns in which a greater amount of data is flowing from the head-end node 14 to the access nodes 16 than from the access nodes 16 to the head-end node 14. As shown in FIG. 2, the flow of information in a network may develop in an asymmetrical nature such that more bandwidth 24 is required to transmit data from the head-end node 14 to the access nodes 16, than is required to transmit data 26 from the access nodes 16 to the head-end node 14. One driving force for such asymmetries in current networks and which is expected as network traffic patterns continue to develop, is the emergence of video on demand. Although the invention may be explained in part using as an example a network designed to carry video on demand, the invention is not limited in this manner as the invention may be deployed to accommodate asymmetric network traffic regardless of the underlying cause of the asymmetry. Although the traffic from head-end node 14 to access node B 16 is shown in FIG. 2 as flowing directly between these entities, in reality the traffic would follow the fiber 22 around the ring and pass through either access node A or access node C before ultimately reaching access node B.

Figure 3:
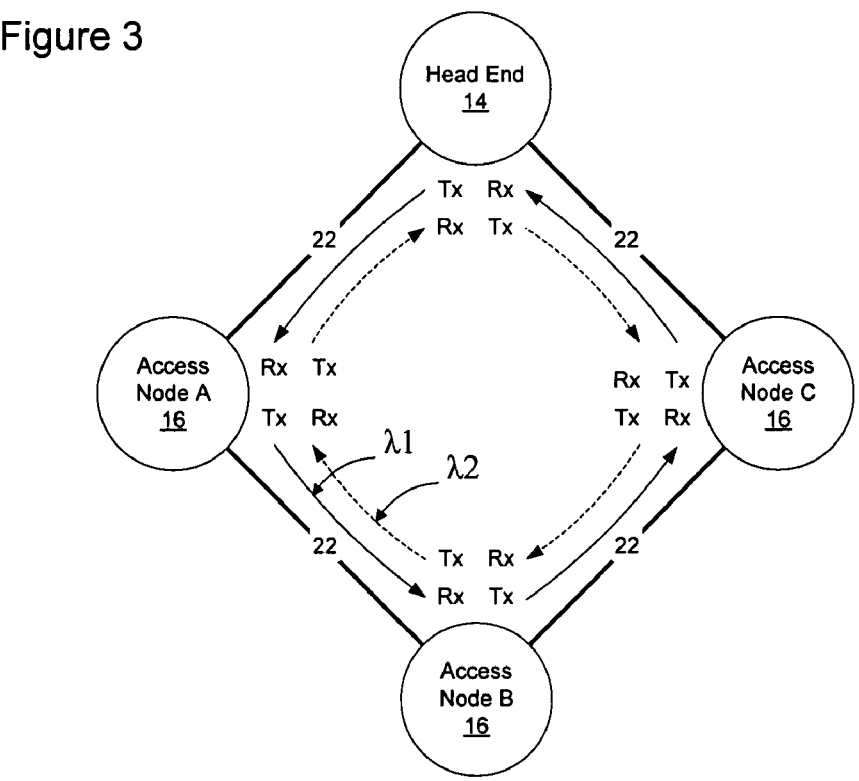
FIG. 3 is a functional block diagram illustrating optical paths in an original ring formed to handle traffic in the example network of FIG. 2.

FIG. 3 illustrates an example network topology including an original ring that has been deployed to interconnect a head-end node 14 with three access nodes 16, nodes A, B, and C. The original ring may be deployed using a single pair of fibers 22 or, alternatively, may be deployed using two or more pairs of fibers 22. As shown in FIG. 3, the fibers 22 interconnect the head-end node 14 with the access nodes 16 to enable optical communication to take place between the network elements on the network. In the embodiment shown in FIG. 3, working traffic is shown using a solid arrow while protection traffic is shown using a dashed arrow. Since working and protection traffic are generally transmitted on different fibers, the same wavelength may be used to carry the traffic on the separate fibers. However, to avoid confusing notation, different wavelengths ($\lambda 1$ and $\lambda 2$) have been shown as being used to carry working and protection traffic on the original ring. Additionally, although the diagram of FIG. 2 shows only two traffic flows such as would be present in a two fiber ring, in a bi-directional ring with 4 fibers the original ring would be expected to have working and protection paths extending in both the east and west directions around the ring. To avoid making the diagram too complicated, only one direction has been shown in FIG. 3. The invention is not limited to the particular way in which the original symmetric ring is formed.

Figure 4:
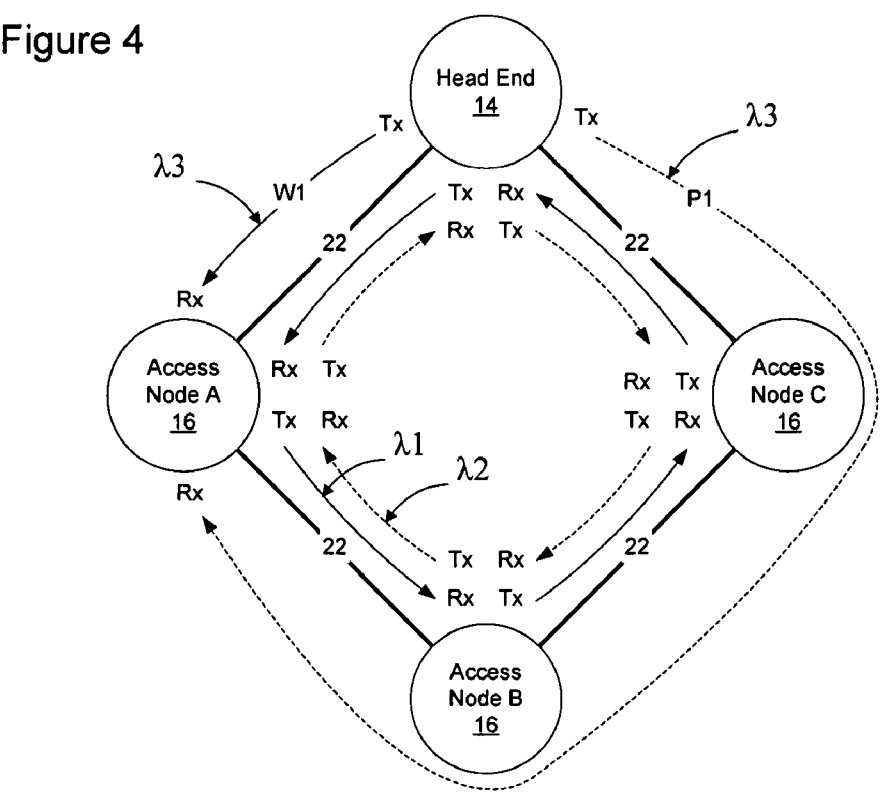
FIGS. 4-6 are functional block diagrams illustrating the incremental adaptation of the original ring network to accommodate asymmetrical network traffic patterns through deployment of PDWs from the head-end node to the access nodes according to an embodiment of the invention.

FIG. 4 illustrates one way of beginning to adapt a ring based network architecture to asymmetrical network traffic patterns. As shown in FIG. 4, as point-to-point bandwidth requirements increase between one of the access nodes (in this example access node A) and the head-end node 14, an additional Protected Dedicated Wavelength (PDW) λ3 may be provisioned over one or more of the fibers forming link 22 that is configured to implement the original ring. The PDW λ3 includes a working path W1 extending in one direction around the original ring and a protection path P1 extending from the head-end node in the other direction around the original ring. By causing two paths to be configured (one for protection and one for working), the unidirectional bandwidth provided by PDW λ3 from head-end node 14 to access node A 16 is protected against a failure on the network. The PDW is not a unidirectional ring architecture, but rather includes two point to point wavelengths extending in different directions around the original underlying ring. The wavelengths originate at the head-end node and terminate at the desired access node. A unidirectional ring, by contrast, would include wavelengths extending in both directions between these points. Accordingly, although the wavelengths forming the PDW will extend in both directions around the ring, they only enable traffic to be transmitted from the head-end node to the access node and, accordingly, do not form a unidirectional SONET ring.

Several protection mechanisms such as 1+1 and 1:1 protection mechanisms may be used to protect traffic on the new network architecture. For example, the head-end node may transmit the data to the access node over both working and protection paths so that, upon loss of signal on one of the paths, the access node can simply pull the data off the other path. Protection of this nature is commonly referred to as 1+1 protection. Alternatively, the head-end node may transmit traffic on the working path and, upon notification of a failure on the working path, may switch the traffic to the protection path. Protection of this nature is commonly referred to as 1:1 protection. Where 1:1 protection is used, the head-end node may be notified of a loss of signal at the access node over the original ring so that either type of protection may be used. Thus, integration of the asymmetrical and symmetrical resources on a common platform enables 1:1 optical protection to be provided to the traffic being carried on the PDWs. Specifically, the integration of the asymmetric and symmetric capabilities on the same platform allows notification of a failure in the asymmetric system PDWs to be transmitted to the head-end node over the original ring, which would not be possible where the asymmetrical and symmetrical systems were implemented on different platforms.

When PDW λ3 is provisioned to provide a dedicated downstream path from head-end node 14 to access node 16, it may be expected that the increase in downstream traffic is accompanied by a concomitant increase in upstream traffic, albeit on a much smaller scale. Since the asymmetric and symmetric resources are deployed using a common platform, upon deployment of the wavelength λ3, downstream working traffic previously carried by the original ring may be moved form the original ring to the PDW λ3 to free up space on the original ring. For example, since the PDW λ3 is unidirectional from the head-end node 14 to the access node 16, the upstream traffic from access node A 16 to head-end node 14 will remain on the original ring. Similarly, any new upstream traffic will also be carried on the original ring. Removing the downstream traffic from the original ring thus frees space on the original ring to allow the original ring to carry upstream traffic from all of the access nodes to the head-end node 14. Thus, additional unidirectional capacity may be added to an existing ring-topology network to allow the original network to adapt to increasingly asymmetrical network traffic patterns. Other ways of allocating flows of working traffic between the available resources (policies) may be used as well and the invention is not limited to this particular described policy.

Figure 5:
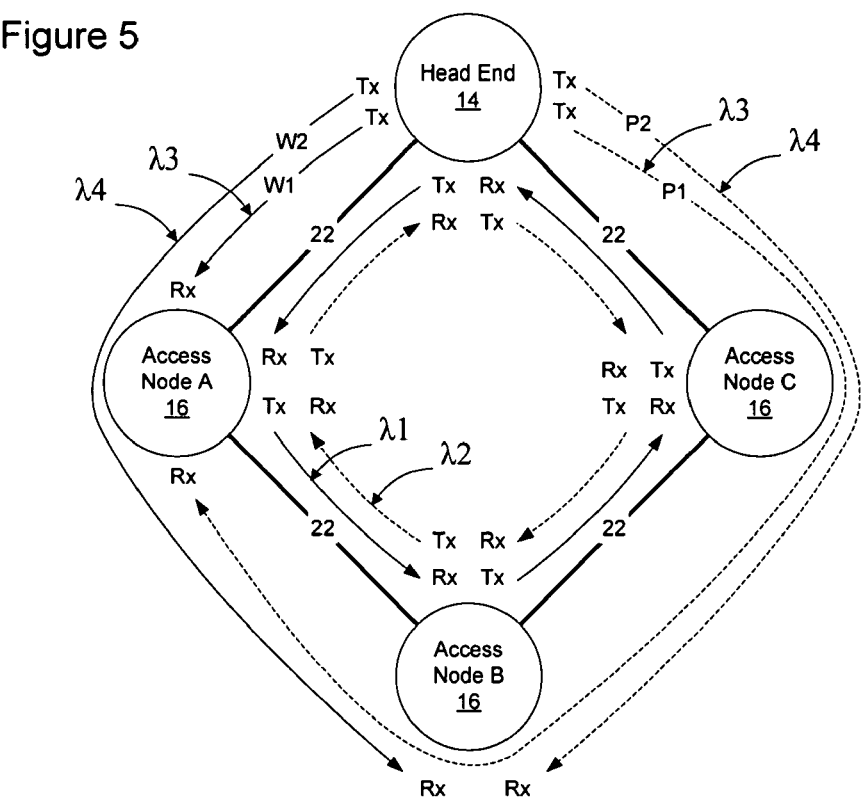
Figure 6:
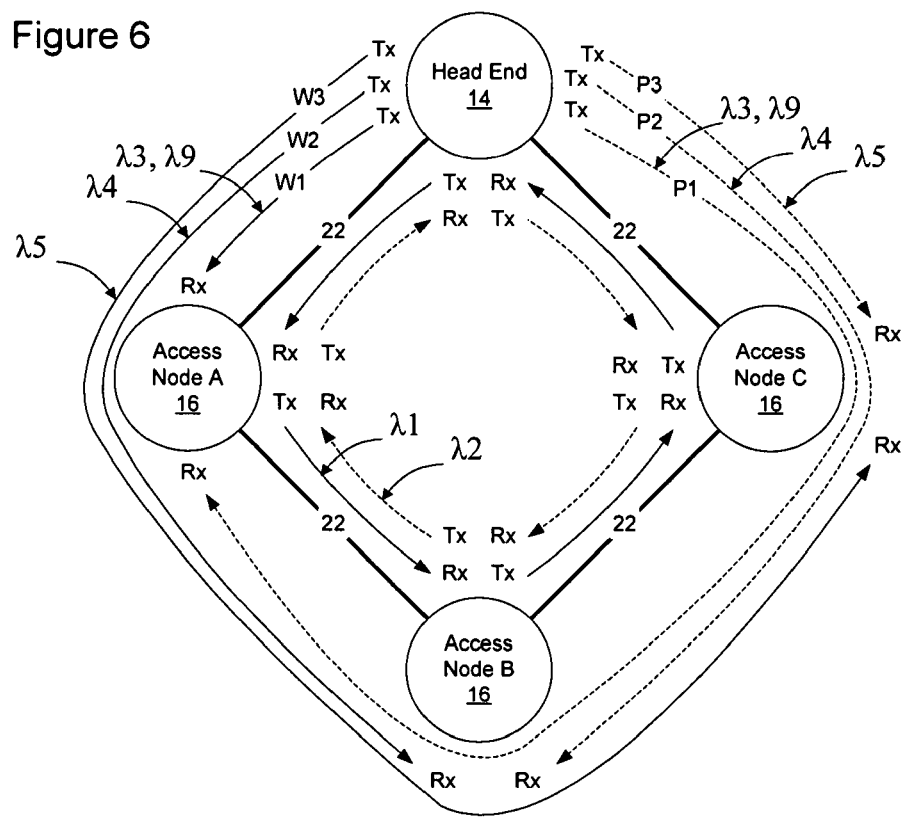

FIGS. 5 and 6 illustrate a process of continuing to add bandwidth to a network as the needs of the access nodes increase and additional asymmetric bandwidth is required to transmit traffic from the head-end node 14 to the access nodes 16. As shown in FIGS. 5 and 6, additional PDWs λ4 (FIG. 5) and λ5 (FIG. 5) may be added to provide point-to-point transmission capacity from the head-end node 14 to access nodes C and D respectively. Similarly, an additional PDW λ9 may be added to further increase the capacity of the network between head-end node 14 and access node A. In each instance, a wavelength in a working path from head-end node 14 to the access node 16 will be provisioned and, at the same time, a wavelength in a protection path from the head-end node 14 to the access node 16 will be provisioned. The dual unidirectional paths forming each PDW enable protection switching of traffic on the PDWs to occur in the event of a failure on the network. By deploying the PDWs on the same platform as the original ring, policy may be applied across the network as a whole to allow traffic work flows to be allocated to be carried by the appropriate network resources. As additional PDWs are deployed, downstream traffic that was flowing between the head-end node and that access node will be moved to the new PDWs to thereby free bandwidth on the original ring so that the original ring can carry additional upstream traffic.

Deploying a wavelength on a fiber may be performed in multiple ways. For example, a wavelength may be deployed on an existing fiber by adding transmit optics at the head-end node and receive optics at the access node that is to be the termination point for that wavelength. Where intermediate nodes are required to pass the traffic around the ring, for example shown in FIG. 5 where access node A is intermediate head-end node 14 and access node B, the intermediate access node (access node A in this example) may be configured as a pass through node. Alternatively, the intermediate node may be configured as an add/drop node in which the node is able to add traffic intended for access node B to the PDW. Time slots may then be allocated to traffic to be carried on a given PDW for more than one access node.

The original ring may be used to carry traffic in the downstream direction between the head-end node and access nodes until a dedicated path is created between the head-end node and the access node. Upon implementation of a dedicated path, such as a PDW, the head-end node may implement policy to selectively take all or some of the downstream workflows between the head-end node and that access node from the original ring, while continuing to consolidate all of the upstream traffic from that access node onto the original ring. Over time, as the network develops as shown in FIGS. 4-6, the downstream traffic may be pulled off the original ring and placed on PDWs through the network while the upstream traffic will continue to be consolidated from all access nodes onto the original ring. By pulling downstream traffic off of the original ring onto the dedicated paths, capacity on the original ring is allowed to be reserved for upstream traffic to thereby reduce the possibility that an additional ring will be required to interconnect all of the access nodes and the head-end node.

Multiple PDWs may be deployed (see FIG. 9) between the head-end node and a particular access node where one PDW is not sufficient to handle the volume of traffic between those nodes.

Figure 7:
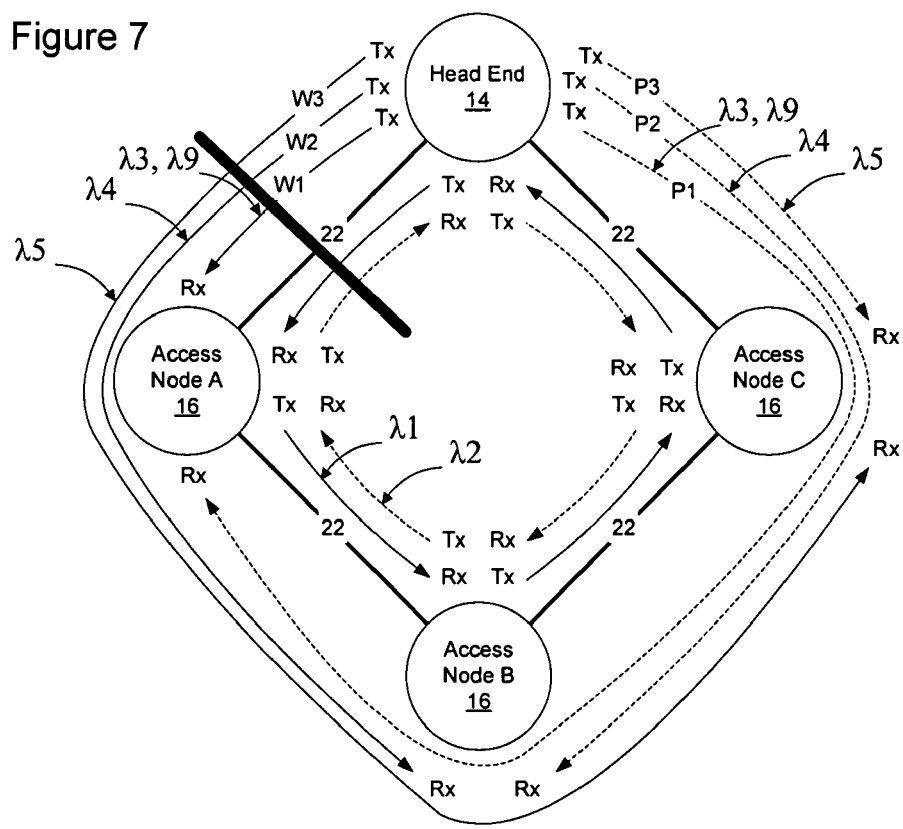
FIGS. 7 and 8 are functional block diagrams illustrating several possible failure scenarios on the network of FIG. 6.

FIG. 7 illustrates an example network in which a fiber cut or other network failure has occurred between the head-end node 14 and access node A. In the following discussion, it will be assumed that the original ring will use conventional protection mechanisms, such as those specified by one of the SONET standards, to switch traffic upon occurrence of a failure on the network. Accordingly, a discussion as to how the traffic on the original ring is handled upon failure will be omitted. The invention is not limited in this manner, as the traffic in the original ring may be protected using a mechanism other than that provided in the SONET standards.

Figure 8:
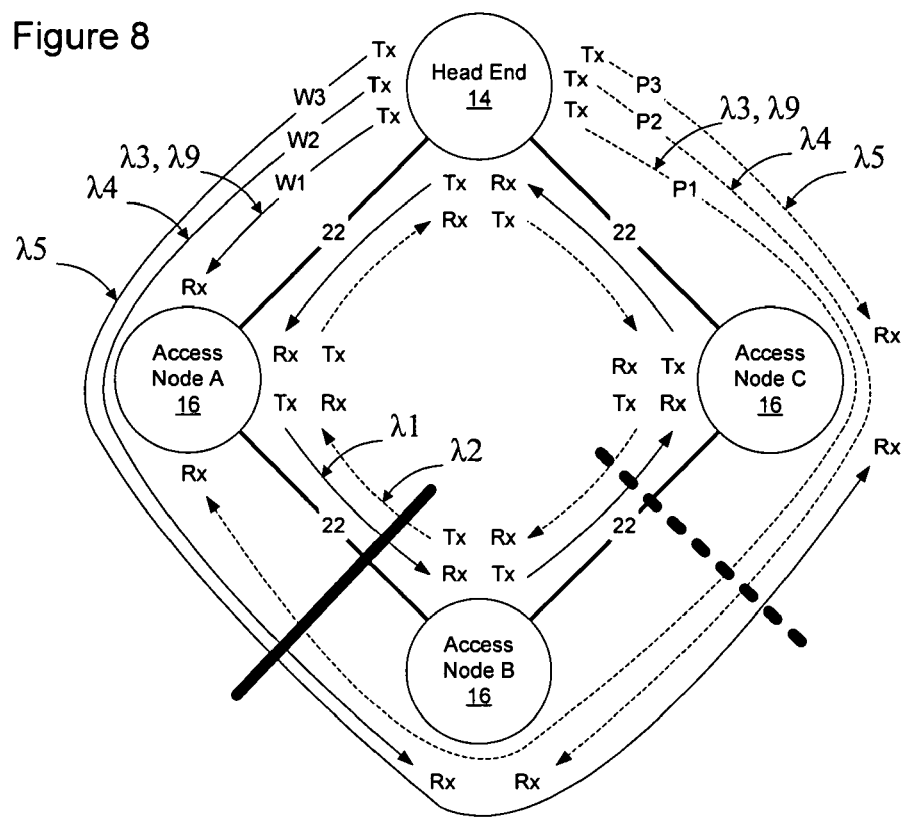

As shown in FIG. 7, when a failure occurs between the head-end node 14 and access node A, RxW1 at access node A will stop receiving traffic and will perceive a loss of signal. If W1 is protected in a 1+1 fashion via protection path P1, access node A will be receiving a duplicate copy of the traffic on RxP1. Accordingly, access node A can protection switch to pull traffic off protection from RxP1. An alarm may be raised by access node A and transmitted over the original ring to the head-end node to indicate a loss of signal on RxW1 at access node A. Similar procedures may be followed if the break occurs between access nodes A and B or between access nodes B and C as shown by the solid and dashed lines in FIG. 8.

If the PDW is protected in a 1:1 manner or as a shared multilink trunk at the layer 2 of the network (link layer), upon a detection of a loss of signal on the working path RxW1, the access node A will transmit a loss of signal alarm over the upstream path provided by the original ring. Upon receipt of the loss of signal alarm the head-end node will protection switch to transmit the traffic over the protection path P1 to the access node A. Access node A will then begin pulling traffic off of the protection path via RxP1 until notified that the head-end node will resume transmission of traffic on the working path.

Figure 9:
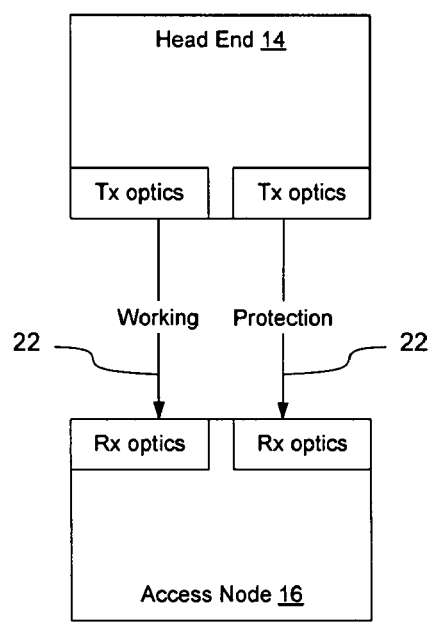
FIGS. 9 and 10 illustrate functional block diagrams of alternate ways of interconnecting the head-end node and access nodes according to embodiments of the invention.
Figure 10:
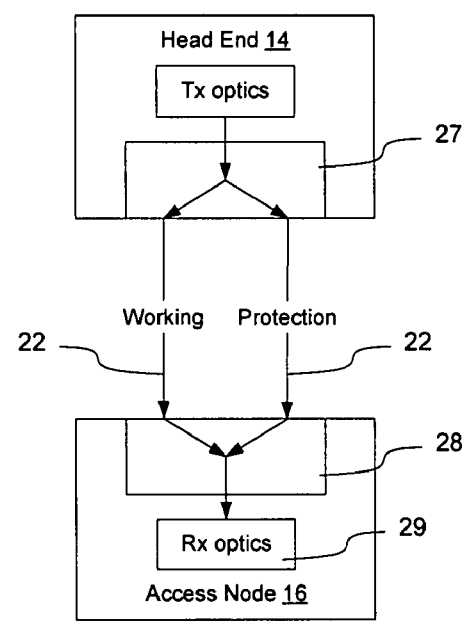

FIG. 9 illustrates an example of an embodiment in which the head-end node 14 and access node 16 each include dedicated Tx and Rx optics for both working and protection PDWs. FIG. 10, by contrast, illustrates an embodiment in which a single set of Tx and Rx optics is used by each of the head-end node and access node for both working and protection traffic. The invention is not limited to these particular embodiments as other ways of transmitting may be used as well.

In the embodiment shown in FIG. 10, a head-end node bridge 27 is used to transmit downstream traffic from the head-end node onto both working and protection fibers for the overlay point-to-point links. As shown in FIGS. 9 and 10, the working traffic W and protection traffic P may be transmitted onto the multiple fibers using individual transmission circuitry (FIG. 9) or, alternatively, a head-end node bridge 24 such as an optical splitter may be used to split the optical signal to be transmitted into two parts which may then be transmitted over the several fibers (FIG. 10). In this manner, common transmission interface optics may be used to generate the signal which may then be bridged across two diverse paths to the access node 16.

At the access node, a tail-end select 28 may be used to select one of the signals (from working or protection) to allow the access node 16 to determine which signal should be selected. The tail-end select may preferentially select the working signal and change to select the protection signal upon detection of a loss of signal on the working path or, alternatively, may monitor the strength of the two signals and preferentially select the better of the two signals. Other criteria may be used as well to select between the several available signals and the invention is not limited to an implementation that operates a tail-end select according to any particular criteria. The access node 16 is connected to the tail-end select 28 with one set of receive optics 29 to thereby reduce the cost of the Rx optics at the access node 16.

In the previous examples, an embodiment has been described in which the working traffic is illustrated as being routed to the west and protection traffic is illustrated as being routed to the east around the fibers forming the original ring. The invention is not limited in this manner as working traffic from the head-end node 14 to the access nodes 16 may propagate in either direction on the PDWs. For example, the working path may be selected to go in a direction around the ring that will minimize the number of intermediate pass through nodes or according to another criteria.

Figure 11:
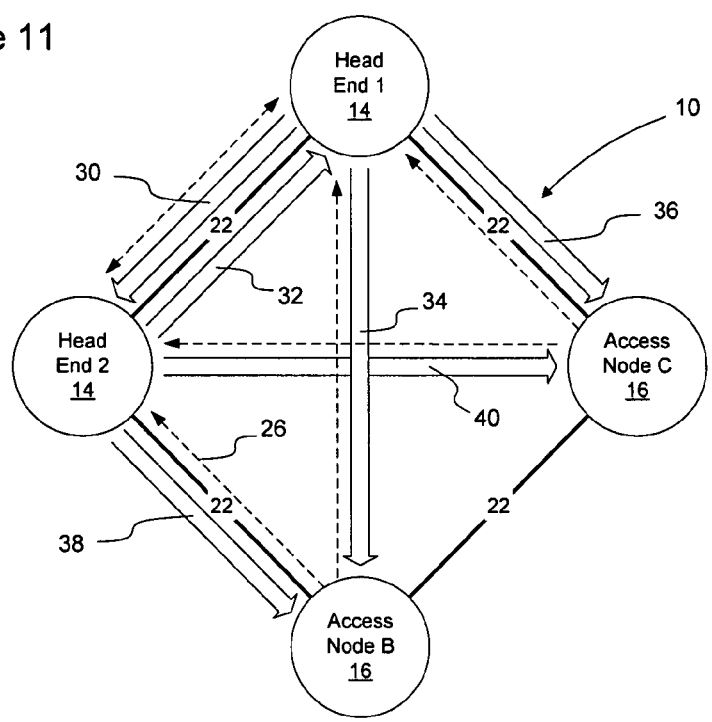
FIG. 11 is a functional block diagram illustrating asymmetrical traffic patterns in an example network having two head-end nodes and two access nodes.

Although the previous embodiment has been described in connection with a single head-end node and a plurality of access nodes arranged around a ring, the invention is not limited in this manner as more than one head-end node may be located on the ring. FIG. 11 illustrates the logical flow of data where more than one head-end node is located on a ring. In the embodiment shown in FIG. 11, two head-end nodes 14 (head-end node 1 and head-end node 2) are configured to transmit data to each other and to each of the access nodes which, in this example, include access nodes B and C. Additional access nodes may be provided as well and the invention is not limited to the particular illustrated example.

As shown in FIG. 11, it may be assumed that each of the head-end nodes 14 is a supplier of content that will be consumed by the access nodes 16 or the subscribers on the access networks 20 connected to the access nodes 16. Additionally, each of the head-end nodes 14 may be connected to an access network and, accordingly, be a consumer of content as well. Accordingly, the network 10 will need to provide high bandwidth connectivity between the head-end nodes 14 (arrows 30 and 32), between head-end node 1 and access nodes B and C (arrows 34 and 36), and between the head-end node 2 and access nodes B and C (Arrows 38 and 40). At the same time, the access nodes 16 will be generating upstream traffic that will need to be transmitted to each of the head-end nodes (dashed arrows 26).

Figure 12:
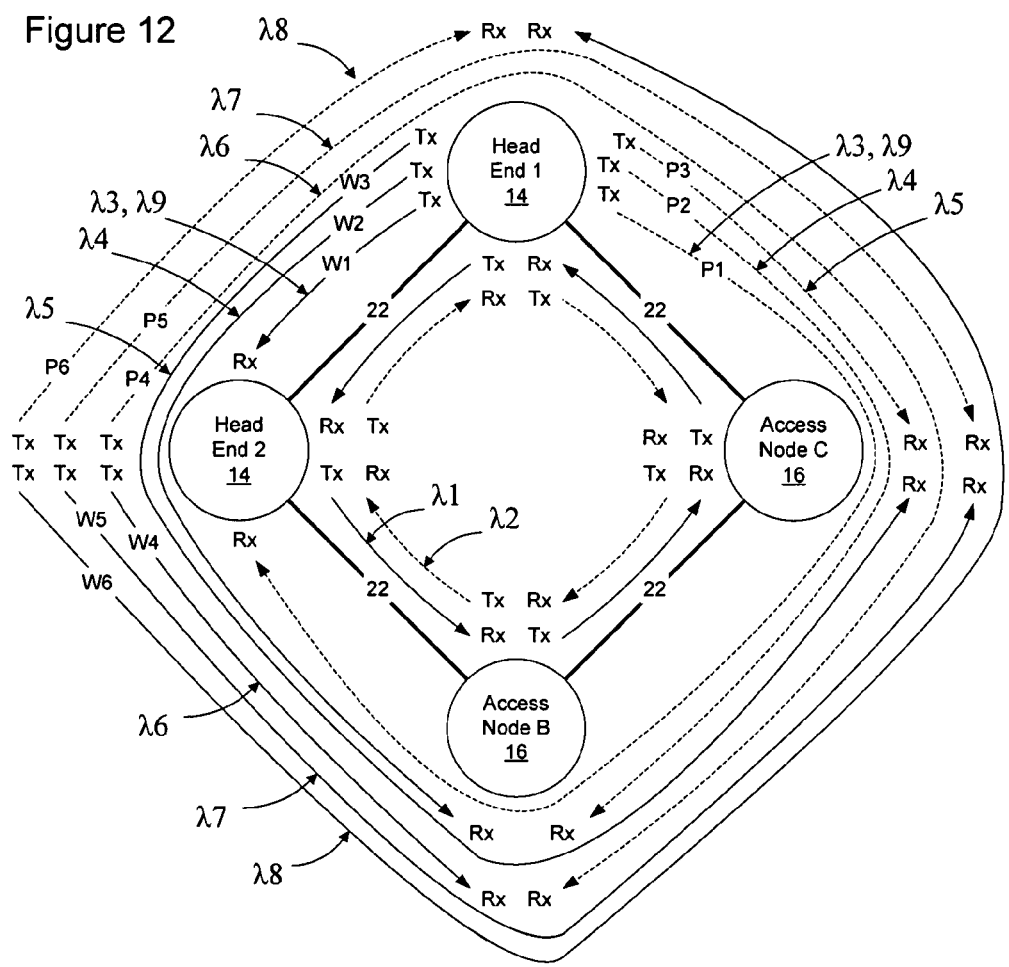
FIG. 12 is a functional block diagram illustrating adaptation of an original network to accommodate asymmetrical network traffic patterns through deployment of PDWs from the head-end nodes to the access nodes according to an embodiment of the invention.

FIG. 12 illustrates an example network architecture in which PDWs have been provisioned over an original ring to accommodate the traffic flows shown in FIG. 11. In the example shown in FIG. 12, three PDWs λ3, λ4, and λ5, have been deployed over fibers 22 to provide dedicated downstream protected bandwidth between head-end node 1 and head-end node 2, access node B, and access node C, respectively. Similarly, three additional PDWs λ6, λ7, and λ8 have been deployed over fibers 22 to provide dedicated downstream protected bandwidth between head-end node 2 and access node B, access node C, and head-end node 1, respectively. Additional PDWs may be deployed as well as network demand increases. In this embodiment, the upstream traffic between the access nodes and the head-end nodes, and optionally upstream control traffic between the head-end nodes, may be carried on the original ring.

In the previous description, it has been assumed that the original ring has sufficient capacity to carry all of the upstream traffic on the network. When the upstream traffic exceeds the bandwidth of the original ring, an additional symmetrical ring may be deployed to carry the upstream traffic. In doing so, one or more of the PDWs may be used to form part of the new ring. The new ring may be added to the common platform so that the resources provided by the new ring may be integrated with the existing symmetric and asymmetric resources.

Figure 13:
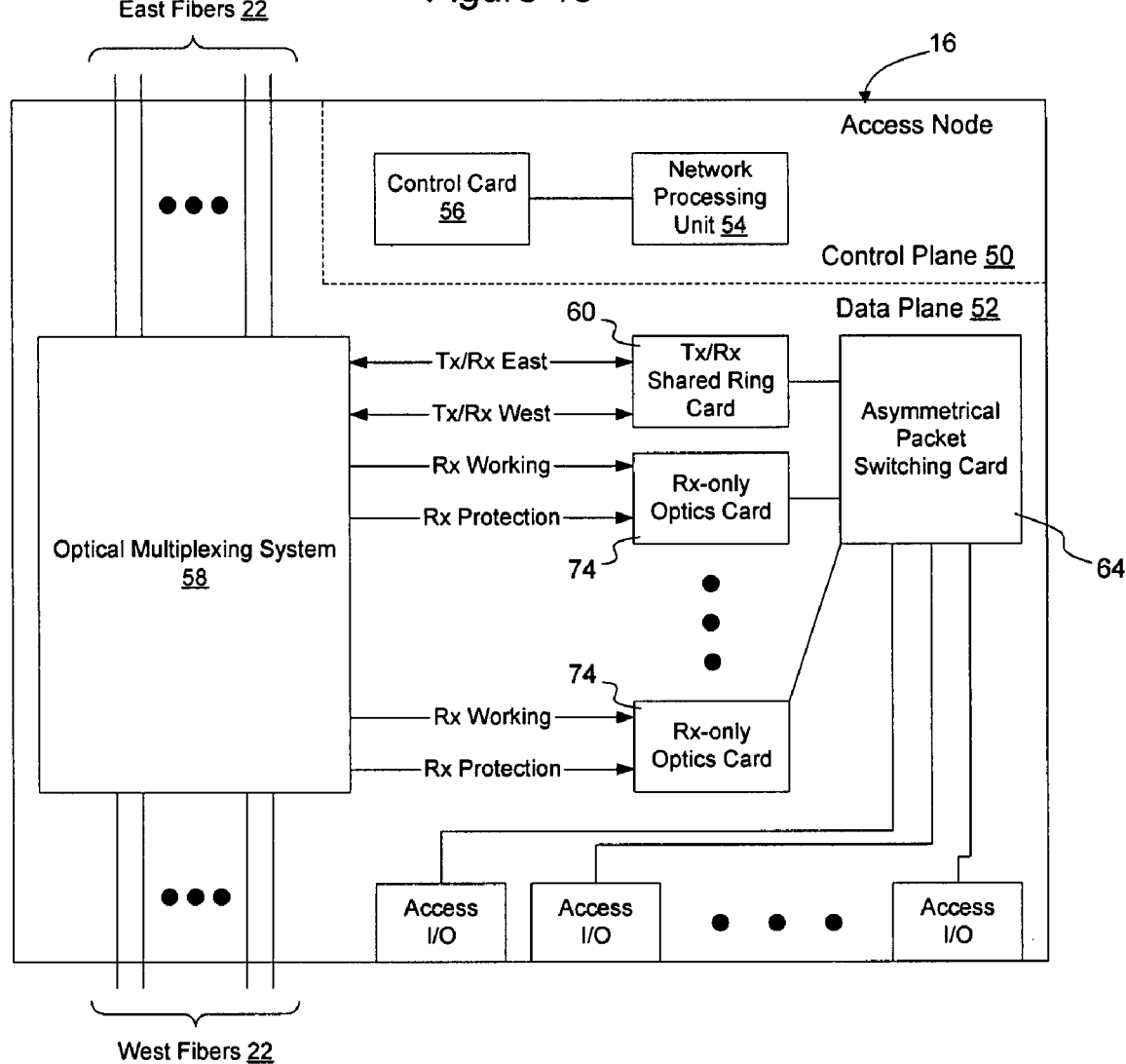
FIG. 13 is a functional block diagram of an access node according to an embodiment of the invention.

FIG. 13 illustrates an embodiment of an access node 16 according to an embodiment of the invention. The invention is not limited to this particular embodiment as many different network element architectures and implementations may be used to practice the invention. In the embodiment shown in FIG. 13, the access node includes a control plane 50 and a data plane 52. The control plane is configured to control operation of the access node in a manner similar to that employed in other conventional network elements and may contain, for example, one or more network processing units 54 and one or more control cards 56. The control plane may be configured to cause PDWs to be configured to terminate at the access node or to pass through the access node. Additionally, the control plane may be configured to establish the requisite interfaces on the network element to allow upstream and downstream traffic associated with a given interface to be transmitted and received over different physical ports. Specifically, since the upstream traffic will be output over the original ring and the downstream traffic will be received over the PDWs, the control plane may be configured in this example to create an interface that allows the traffic to be bifurcated in this manner.

The data plane is optimized to handle high-bandwidth traffic to cause the traffic to be passed through the access node. Packets addressed to the access node, that are intended to be received by the access node to affect its operation, are received by the data plane and passed to the control plane. The control packets are terminated at the control plane and used by the network processing unit and/or control card to control how the access node is operating. Other packets that are not to be used by the access node are passed through the data plane without being terminated at the access node. Thus, the data plane in this embodiment is optimized to handle traffic by allowing the traffic to be redirected or switched from an input port to one or more appropriate output ports. For example, video traffic may be received over one of the ports connected to a PDW, switched, and output over one or more of the I/O ports connected to an access network 20. Other data plane architectures may be used as well and the invention is not limited to the particular implementation illustrated in FIG. 13.

In the embodiment illustrated in FIG. 13, the data plane includes a reconfigurable optical multiplexing system 58. The optical multiplexing system 58 connects to the north fibers 22 and south fibers 22 and allows multiple wavelengths to be provisioned over the fibers. The optical multiplexing system 58 allows the access node to selectively receive and transmit data over one or more wavelengths onto the fibers to provide a physical interface to the fibers. The optical multiplexing system 58 may be implemented, for example as mux/demux filters, optical add/drop couplers, or as remotely configurable optical add/drop multiplexer (ROADM). The invention is not limited to the particular way in which the optical multiplexing system is implemented.

The data plane 52 also includes one or more Tx/Rx shared ring cards 60 to interconnect with the original ring. The Tx/Rx shared ring cards may have symmetrical capacity in receive and transmit directions or, alternatively, may have increased capacity in one direction. The Tx/Rx line cards may be implemented in a conventional manner, for example as 10G Tx/rRx DWDM line cards, although the invention is not limited in this manner.

The data plane 52 also includes one or more Rx-only optics cards 62 configured to allow the access node to have increased Rx capacity. The Rx-only optics card(s) allow asymmetric bandwidth to be terminated at the access node so that PDWs may be provisioned between the head-end node and the access node 16. Thus, the access node is provided with more receive capacity than transmit capacity given the anticipated asymmetrical nature of the traffic to be handled by the access node. As additional capacity is deployed, additional Rx cards may be added to the access node 16 to further increase its capacity. Although the illustrated embodiment shows the Tx/Rx and Rx cards as separate cards, they may be combined if desired as well so that the cards use up fewer slots in the access node.

The data plane also includes one or more switching cards 64 configured to switch traffic between interfaces on the access node 16. Additionally, the access node includes on or more I/O access cards 66 configured to interface with subscribers. The I/O access cards may be configured to interface with links in the access networks 20. Conventional switching cards may be used to handle the traffic on the data plane and the invention is not limited to the use of a particular switching card or data plane architecture.

In operation, multiple wavelengths will be received over the fibers 22 by the ROADM. Those wavelengths that are to be processed by the access node 16 will be passed either to the Tx/Rx shared ring card 60 or the Rx only optics card 74 depending on the wavelength being used for the transmissions. The optics cards 60, 62 will convert the received optical signals into electrical signals and process the electrical signals to create packets or frames of data. The packets/frames of data will then be passed to the switching card 64 to be switched to the proper access I/O card 66 for transmission over the links in the access network 20. Wavelengths that are not to be terminated at the access node will be passed through the access node. As is well known in the art, the wavelengths that are to pass through may optionally be regenerated and amplified before being output by the intermediate access node.

Figure 14:
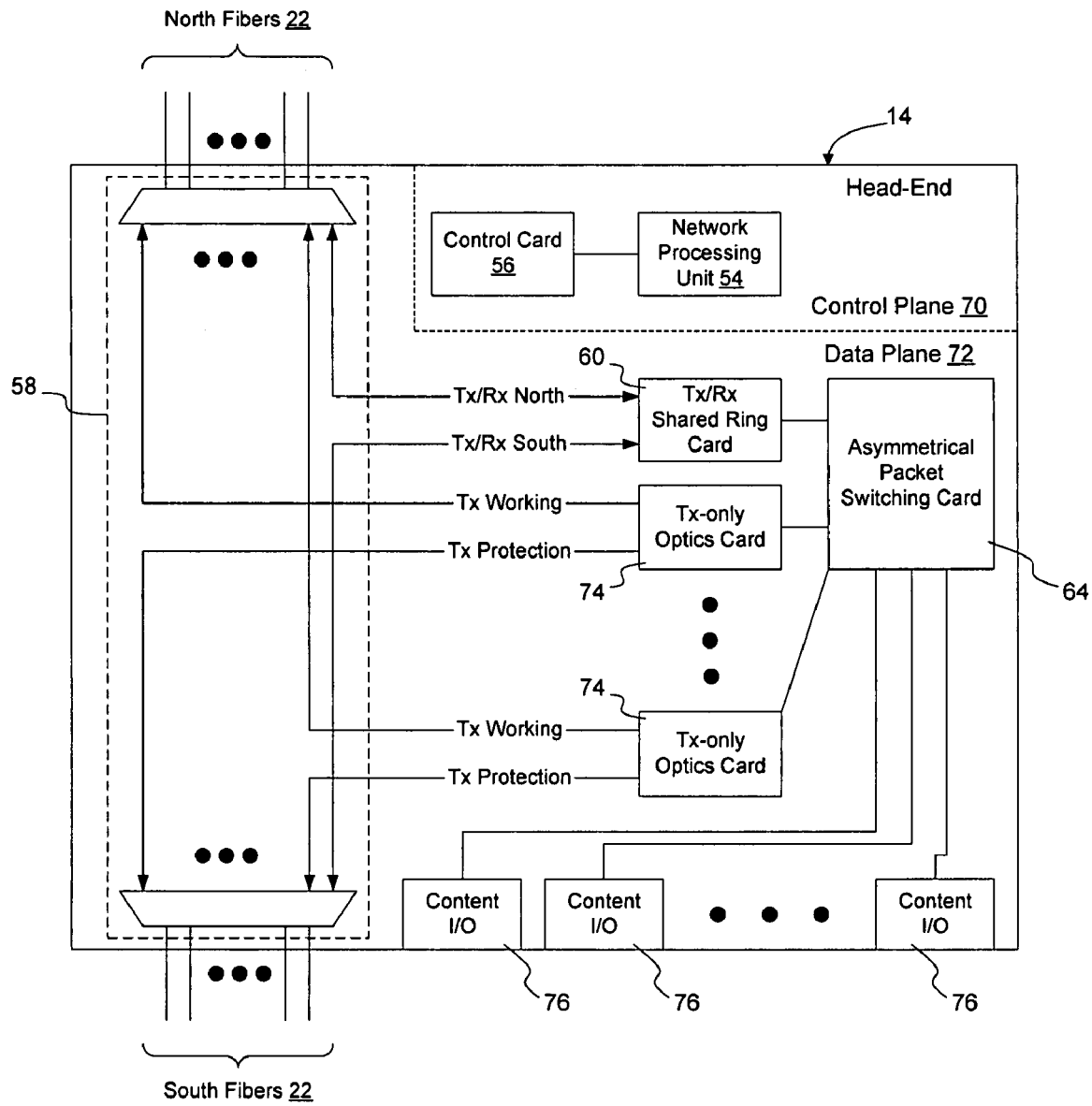
FIG. 14 is a functional block diagram of a head-end node according to an embodiment of the invention.

FIG. 14 illustrates a head-end node 14 according to an embodiment of the invention. Configuration of the head-end node is similar to the configuration of the access node of FIG. 13, except that the head-end node is configured to have increased Tx capacity whereas the access node is configured to have increased Rx capacity. Specifically, as shown in FIG. 14, the head-end node 14 includes a control plane 70 and a data plane 72.

The head-end node includes both Tx/Rx cards for the original ring and one or more cards to support the asymmetric Tx capacity provided by the new PDWs. The control plane of the head-end node 14 is configured, e.g. via software running on network processing unit 54, to apply policy to the flows on these network resources to cause both the symmetric and asymmetric resources to be used together to transport traffic on the network. The policy may be set by a network administrator, by default, or automatically by the head-end node by causing the head-end node to seek to minimize jitter, delay, congestion, or other conditions on the network or in connection with particular classes of flows. For example, the control plane may cause symmetric traffic such as voice traffic on the original ring while causing one-directional traffic such as video traffic to be transported over one or more of the PDWs. The policies may be implemented by the control plane through appropriate programming of the data paths implemented in the data plane of the head-end node.

Policies may be based on the type of data flow, for example to differentiate between voice, video, and data traffic. Policies may be implemented by causing the control plane to program the data plane to implement rules or filters to cause particular types of traffic to be filtered to be output on either the symmetric or asymmetric network resources. The invention is not limited to a particular way of implementing the rules in the data plane. Additionally, the invention is not limited to implementing a particular class of policies, since multiple different policies and types of policies may be implemented using embodiments of the invention.

The data plane 72 includes an optical multiplexing system 58 which, in this example, is illustrated as a plurality of mux/demux devices. The invention is not limited in this manner as the optical multiplexing system 58 may also be implemented using other technologies as set forth above. The data plane 72 also includes a Tx/Rx optics card configured to interface with the original ring, and an asymmetrical packet switching card 64. These components are all similar to the corresponding components discussed above in connection with the access node. In addition, the head-end node 74 includes a Tx-only optics card 74 configured to output data onto PDWs configured on the fibers 22. The Tx-only optics card may be a 10GTx card or a line card configured in another manner to output data from the head-end node.

Content may be received by the head-end node over the fibers 22 or, alternatively, over one or more dedicated content I/O cards 76. For example, where the content is received from a content source 11 such as a satellite feed 12 or a content server 13, the content may be received by the head-end node over one or more dedicated content I/O cards 76. The content I/O cards may be Rx-only cards or, alternatively, may be Tx/Rx cards. The invention is not limited to the particular way of configuring the head-end node 14 to receive the content for distribution to the access nodes.

In the head-end node 14, control packets intended to affect operation of the head-end node are received by the data plane and passed to the control plane. The control packets are terminated at the control plane and used to perform numerous functions on the head-end node. For example, the control plane may cause new PDWs to be created, may cause traffic to be switched from working to protection on a given PDW, may cause the underlying ring to protection switch, etc. The control card 60 and network processing unit 62 thus allow protection switching to occur on the original ring and on the PDWs provisioned on the network. Additionally, the control card 60 and network processing unit 62 allow the data plane to be programmed to cause downstream traffic intended for the head-end nodes to be output over the provisioned PDWs via the Tx-only optics cards 74, and allow upstream traffic from the same access node to be received on the original ring via the Tx/Rx shared ring card 60. Accordingly, the control plane 70 is configured, in this embodiment, to allow asymmetric protected traffic to be transmitted on the fibers 22 forming network 10.

It should be understood that all functional statements made herein describing the functions to be performed by the methods of the invention may be performed by software programs implemented utilizing subroutines and other programming techniques known to those of ordinary skill in the art. Alternatively, these functions may be implemented in hardware, firmware, or a combination of hardware, software, and firmware. The invention is thus not limited to a particular implementation.

The various functions described herein may be embodied as a software program implemented in control logic on a processor, such as network processing unit 54 on head-end node 14 or access node 16, or may be configured as a FPGA or other processing unit on the network element. The control logic in this embodiment may be implemented as a set of program instructions that are stored in a computer readable memory within the network element and executed on a microprocessor on the network element. However, in this embodiment as with the previous embodiments, it will be apparent to a skilled artisan that all logic described herein can be embodied using discrete components, integrated circuitry such as an Application Specific Integrated Circuit (ASIC), programmable logic used in conjunction with a programmable logic device such as a Field Programmable Gate Array (FPGA) or microprocessor, or any other device including any combination thereof. Programmable logic can be fixed temporarily or permanently in a tangible medium such as a read-only memory chip, a computer memory, a disk, or other storage medium. Programmable logic can also be fixed in a computer data signal embodied in a carrier wave, allowing the programmable logic to be transmitted over an interface such as a computer bus or communication network. All such embodiments are intended to fall within the scope of the present invention.

It should be understood that various changes and modifications of the embodiments shown in the drawings and described herein may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of providing integrated asymmetrical and symmetrical network capacity on a protected optical ring network, the protected optical ring network including a head-end node and a plurality of access nodes interconnected along optical fibers forming a ring network topology, the method comprising the steps of:

provisioning the symmetric protected optical network capacity on the optical ring network topology by configuring the head-end node and each of the access nodes to transmit and receive data on the ring; and provisioning the asymmetric network capacity on the optical ring network topology by configuring the head-end node to transmit data on a first protected dedicated wavelength and configuring a first of the access nodes to receive data on the first protected dedicated wavelength, said protected dedicated wavelength originating at the head-end node and terminating at the first access node and not continuing around the ring, said protected dedicated wavelength having a working path that extends in a first direction around the optical ring from the head-end node to the first of the access nodes and ends at the first of the access nodes to not continue around the ring past the first of the access nodes, and a protection path that extends in an opposite direction around the optical ring from the head-end node to the first of the access nodes and ends at the first of the access nodes to not continue around the ring past the first of the access nodes;

wherein the head-end node is configured to have a common platform on which the symmetric network capacity and the asymmetric network capacity is provisioned, said common platform enabling the head-end node to apply policy to the network traffic intended to be transmitted from the head-end node to the first access node such that the network traffic may be selectively transmitted by the head-end node to the first access node over the symmetric network capacity or over the asymmetric network capacity according to the policy.

2. The method of claim 1, wherein the asymmetric network capacity is protected to enable fast protection switching of traffic from a working channel to a protection channel in the event of a failure on the ring between the head-end node and the first access node.

3. The method of claim 1, wherein the first protected dedicated wavelength is provisioned between the head-end node and the first access node over at least one of the optical fibers forming the ring, said first protected dedicated wavelength containing a working channel and a protection channel, said working channel originating at the head-end node and terminating at the first access node and extending in a first direction around the ring, and said protection channel originating at the head-end node and terminating at the first access node and extending in a second direction, different than the first direction, around the ring.

4. The method of claim 3, wherein the working channel is formed from a wavelength transported on the fibers in a first direction around the ring and wherein the protection channel is formed from a wavelength transported on the fibers in a second direction around the ring.

5. The method of claim 4, wherein the working channel and protection channel provide 1:1 protection for transmission of traffic between the head-end node and the access node.

6. The method of claim 4, wherein the working channel and protection channel provide 1+1 protection for transmission of traffic between the head-end node and the access node.

7. The method of claim 1, further comprising the step of applying policy on the first platform to allocate working flows of traffic to the ring and to the protected dedicated wavelength.

8. The method of claim 1, wherein the symmetric network capacity is a SONET ring.

* * * * *